Sept. 5, 1933.  R. R. WALTER  1,925,292
METHOD OF SINTERING METALLIC BODIES
Filed April 2, 1931   2 Sheets-Sheet 1

INVENTOR
RICHARD R. WALTER
BY
ATTORNEY

Sept. 5, 1933. R. R. WALTER 1,925,292
METHOD OF SINTERING METALLIC BODIES
Filed April 2, 1931  2 Sheets-Sheet 2

INVENTOR
RICHARD R. WALTER
BY
ATTORNEY

Patented Sept. 5, 1933

1,925,292

UNITED STATES PATENT OFFICE 1,925,292

METHOD OF SINTERING METALLIC BODIES

Richard R. Walter, Starnberg, Germany

Application April 2, 1931, Serial No. 527,175, and in Germany April 7, 1930

1 Claim. (Cl. 75—22.5)

Metallic bodies made from powdered raw materials, such as, for example, sintered hard alloys of metallic carbides and the like, require very careful treatment during the sintering process. As is well known, sintered bodies of this type have the advantage as compared with fused or crystallized alloys that they are subject to considerably less internal strains. The sintering process must therefore as a rule not be carried to the point at which crystallization takes place, but at the same time the temperatures employed must be high enough to ensure thorough sintering in order to obtain the required mechanical strength in the finished articles. There is therefore a more or less narrowly defined range of temperature available for the sintering process, according to the composition of the alloys employed. Moreover, not only must the sintering temperature be kept within the permissible limits for any particular case, but it is also necessary that the bodies be heated evenly throughout to an absolutely uniform temperature, and be retained at this temperature throughout the entire process. Even slight deviations in temperature between different parts of the bodies treated lead to distortion, cracking, or uneven contraction.

The sintering of metallic bodies, in particular of hard alloys, has been carried out hitherto by passing the same in boats of a refractory mass or of carbon slowly through a heated tube. For this purpose there have generally been employed hitherto the known carbon tube resistance furnaces in which the heating current traverses the tubular wall. The sintering process in these furnaces often requires a number of hours, and the rate of feed of the bodies through the tube, in view of the limited length of the tube, can only be very slow. The most generally required temperatures are of the order of from 1,300 to 1,800° C., and it is impossible to retain the heating tubes throughout their entire length at a uniform temperature of this height; in actual fact the temperature tends to be highest in the middle of the tube, and to fall off towards the cooled terminals at the two ends. The result is that the bodies travelling slowly through the heating tube are at the required maximum temperature only for a short distance in the middle portion of the tube. The effective heating surface of tubular furnaces of this type is therefore very limited.

Furnaces of this type suffer from the further drawback that the heating surface, i. e., the inner wall of the tube, must not be at too great a distance from the bodies to be sintered, since otherwise a uniform and thorough sintering cannot be effected. For this reason the process is limited to the employment of comparatively narrow tubes the internal diameter of which may not, in practise, exceed 80–100 mm.; the dimensions and therewith the capacity of such furnaces are therefore very strictly limited.

If bodies to be sintered are passed through tubular furnaces or furnaces with heated round bars or flat plates constantly in the same direction as the heating current the further disadvantage results that the bodies in their softened state are easily deformed by the electro-dynamic action of the heating current, these bodies, particularly when they are of considerable length, becoming more or less powerfully distorted.

The present invention obviates all the described drawbacks by providing that the bodies to be sintered are moved past the heating surfaces of an electric furnace with a constant movement of rotation. By this means the differences of temperature between the middle and the ends of the heating elements are effectually compensated for, and at the same time the electro-dynamic action on the bodies to be sintered is eliminated. As a consequence of the rotary movement the bodies move alternately past regions of varying temperature and are thus kept automatically at a uniform mean temperature which can easily be observed from outside, and regulated by alteration of the heating current. In this manner also the heating process is rendered independent of the effect of the unavoidable inequality of the electric resistance of the separate heating elements. Whereas with the tubular furnaces hitherto used the carbon heating tube required to be kept under constant observation and regulated as to temperature, the process provided by the present invention is unaffected by one of the heating elements having a higher or lower working temperature than the adjacent element in consequence of differences of resistance. The constant movement or rotation has a compensatory effect.

Moreover by the described means the position of each of the bodies to be sintered is constantly being altered in relation to the heating elements, so that the electro-dynamic action of the latter is also thereby compensated.

Figure 1:
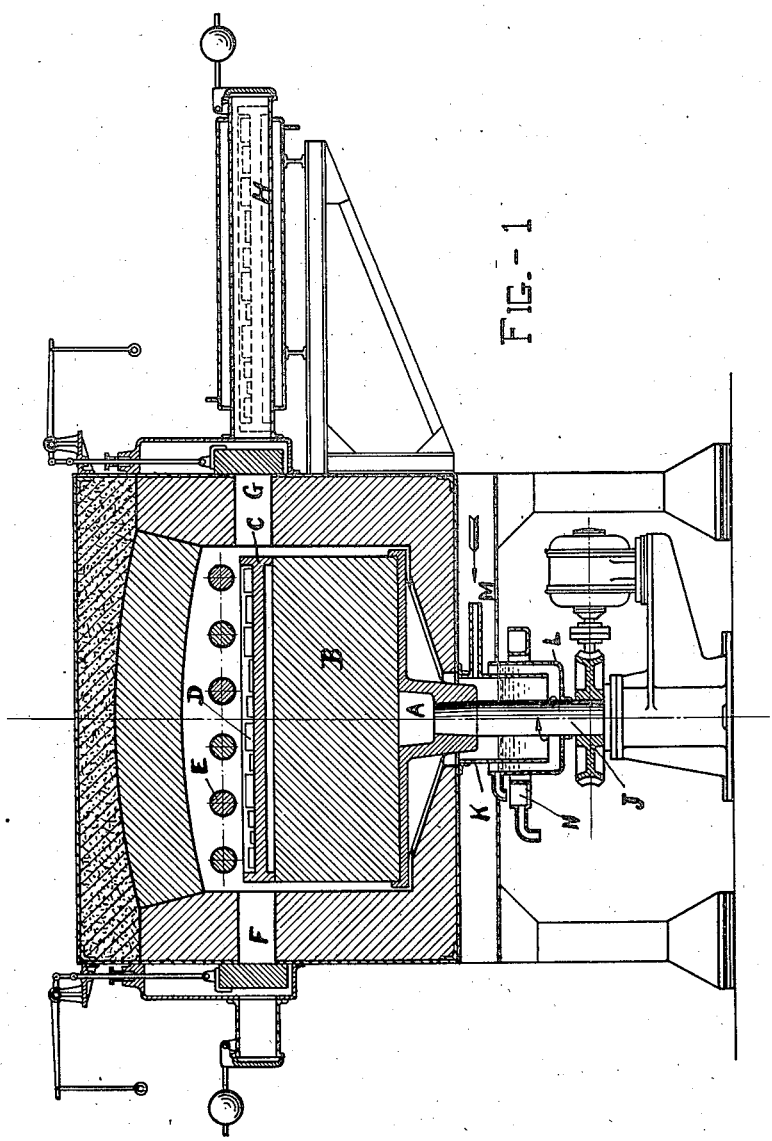
Fig. 1 is a part elevation and part sectional view of an electric furnace adapted to carry out my process of sintering.

A device for the carrying out of the process according to the invention is shown, by way of example, in Fig. 1 of the accompanying drawings. In the completely enclosed interior of the furnace there is arranged a revolving table A which is provided with a sufficiently thick block B of refractory material or carbon to prevent the dissipation of heat in a downward direction. Upon this block there is arranged a plate C for the reception of the metallic bodies D to be sintered. Above this plate are disposed the heating elements E consisting of bars or plates of carbon, silicon carbide, or the like which are brought to the required temperature by resistance heating, and in their turn heat by radiation the bodies rotated past and under them.

The carrying plates C are introduced into the furnace through the slot F, and after completion of the sintering process are removed through the slot G, whence they can be transferred to a cooler H.

During the sintering process the interior of the furnace in almost every case must be protected against the admission of atmospheric oxygen, and for this reason the sintering is carried out in a reducing or neutral atmosphere. In order to maintain such an atmosphere the shaft J which carries the revolving table must be packed where it leaves the furnace either by means of a stuffing-box, or by means of a hydraulic siphon for instance of the type indicated in Fig. 1 which is intended to act at the same time as a cooler for the lower portion of the shaft. For this purpose the lower wall of the furnace is provided with a sheet metal cylinder K which projects into an outer cylinder L attached to and rotating with the shaft J. The cooling water is introduced into the cylinder K at M, rises in the cylinder L, and flows over into the fixed trough N from which it is allowed to flow away. The column of water in the cylinders L and K serves at the same time to seal the interior of the furnace from the atmosphere.

Figure 2:
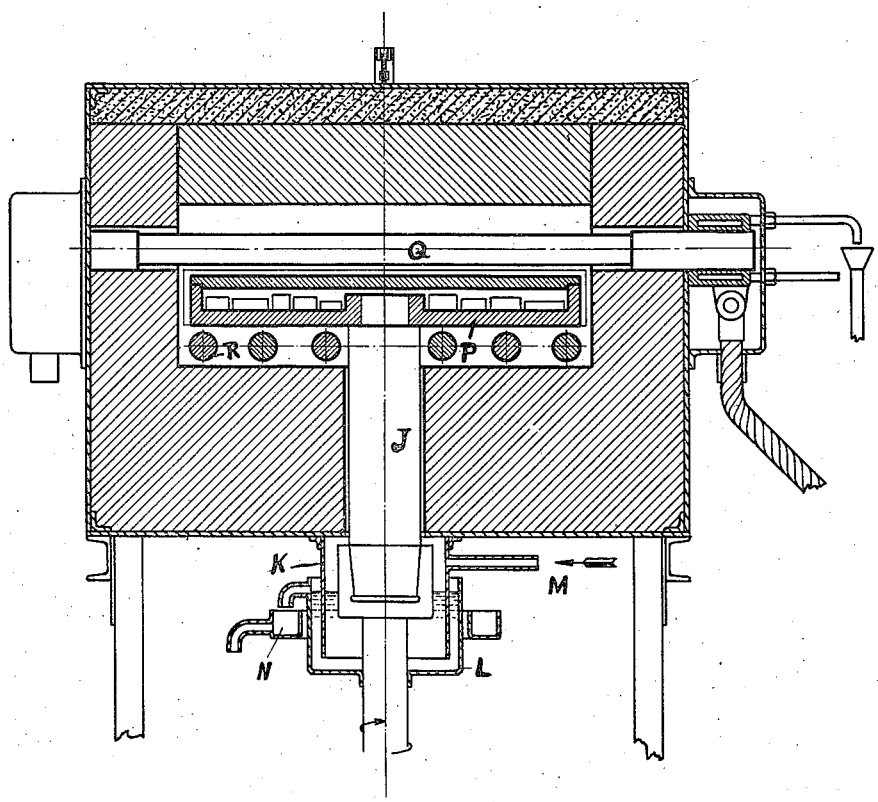
Fig. 2 is a corresponding view of a modified form of furnace for performing my method.

Fig. 2 shows a modified form of construction of the furnace for the carrying out of the process according to the invention. The bodies to be sintered are in this case irradiated from two sides simultaneously, from above and from below. It is advisable in this case to make the upper portion of the shaft J of carbon to be able to withstand the high temperature to which it is exposed. Instead of being placed on a plate C (Fig. 1) the bodies to be sintered can be inserted in a closed firing case P (Fig. 2). This case is then uniformly irradiated from above by the heating elements Q, and from below by the heating elements R.

The bodies to be sintered, whether placed on a plate C or inserted in a case P, can also be packed, with a view to increasing the uniformity of the heating, in a known manner in powdered or granular substances, such as for example carbon, magnesite, fused alumina, and the like.

If, as shown in Fig. 2, more than one layer of heating elements be employed it is advisable, for the purpose of reducing still further the electrodynamic action upon the bodies to be sintered, to dispose these layers of heating elements (Q and R) in different directions as regards their length.

Through suitable inspection openings the receptacles C or P containing the bodies to be sintered, which assume a uniform mean temperature according to the current load, can be kept under observation and checked as to temperature.

The furnace constructions shown in Figs. 1 and 2 represent merely examples of possible forms, and it will be clear that the same effect can be achieved with different means. The bodies to be sintered can be inserted for example in revolving crucibles, boxes, or cylinders which are then subjected to radiated heat from heating elements from the outside or from the inside; or a number of crucibles or receptacles can be arranged in a circle on a revolving table, and so forth. It is merely necessary that the guiding principle of the invention be followed, namely that the bodies to be sintered be caused through continuous movement to constantly alter their position in relation to the heating surface during the sintering process.

As will be further seen from the furnace constructions illustrated in Figs. 1 and 2 the process according to the present invention permits of the employment of considerably larger furnace units than those used hitherto, so that, apart from the increase in output, a reduction in the costs of sintering is achieved.

I claim:

A method of sintering metallic bodies, comprising effecting circulatory movement of the body to be sintered between electrical heating elements disposed in chordal arrangement with respect to the circular plane of movement and also disposed above and below the generated circle of movement and with the upper and lower heating elements extending in different directions respectively.

RICHARD R. WALTER.